US012652643B2

(12) United States Patent
Balasubramanian et al.

(10) Patent No.: US 12,652,643 B2
(45) Date of Patent: Jun. 9, 2026

(54) VEHICLE-TO-EVERYTHING BASED USER EQUIPMENT TO USER EQUIPMENT RANGING

(71) Applicant: QUALCOMM Incorporated, San Diego, CA (US)

(72) Inventors: Anantharaman Balasubramanian, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/469,983

(22) Filed: Sep. 19, 2023

(65) Prior Publication Data

US 2025/0097895 A1      Mar. 20, 2025

(51) Int. Cl.
| | |
|---|---|
| *H04W 64/00* | (2009.01) |
| *H04L 5/00* | (2006.01) |
| *H04W 76/18* | (2018.01) |

(52) U.S. Cl.
CPC ......... *H04W 64/003* (2013.01); *H04L 5/0048* (2013.01); *H04W 76/18* (2018.02)

(58) Field of Classification Search
CPC ... H04W 64/003; H04W 76/18; H04W 64/00; H04W 76/14; H04W 12/02; H04W 4/40; H04W 4/023; H04L 5/0048
See application file for complete search history.

(56) References Cited

U.S. PATENT DOCUMENTS

| | | |
|---|---|---|
| 2021/0352481 A1 | 11/2021 | Guo et al. |
| 2023/0213607 A1 | 7/2023 | Dong |
| 2025/0106815 A1* | 3/2025 | Hu ...................... H04W 64/006 |
| 2025/0151013 A1* | 5/2025 | Wang ................... H04W 64/00 |

FOREIGN PATENT DOCUMENTS

| | | |
|---|---|---|
| WO | 2023126181 A1 | 7/2023 |

OTHER PUBLICATIONS

3GPP TR 23.700-86 "3rd Generation Partnership Project, Technical Specification Group Services and System Aspects, Study on Architecture Enhancement to support Ranging based services and sidelink positioning (Release 18)", 3GPP Standard, Technical Report, 3rd Generation Partnership Project, Mobile Competence Centre, 650, Route Des Lucioles, F-06921, Sophia-Antipolis Cedex, France, No. V18.0.0, Mar. 31, 2023, 173 Pages, XP052284164, Sections 6.7, 6.8, 6.18, 6.21-6.25, 6.31, 6.34.
International Search Report and Written Opinion—PCT/US2024/043994—ISA/EPO—Nov. 22, 2024.

* cited by examiner

*Primary Examiner* — Kabir A Timory
(74) *Attorney, Agent, or Firm* — Thien T. Nguyen

(57) ABSTRACT

Techniques for determining a position of at least one target user equipment (UE) with respect to a source UE, wherein the source UE and at least one target UE are in communication with a communication network having at least one radio access network (RAN) and a network entity include transmitting to the network entity, via at least one transceiver and the at least one RAN, a request for positional information of the at least one target UE with respect to a first location of the source UE; and receiving from the network entity, via the at least one transceiver, the positional information, wherein the positional information is based on a location of the at least one target UE.

39 Claims, 10 Drawing Sheets

600

502 First Target UE

508 RAN

510 Network Entity

506 RAN

504 Source UE

604

602

606 Determine positional information of the first target UE

608 Determine Positional information of the source UE

610 Range Determination

612

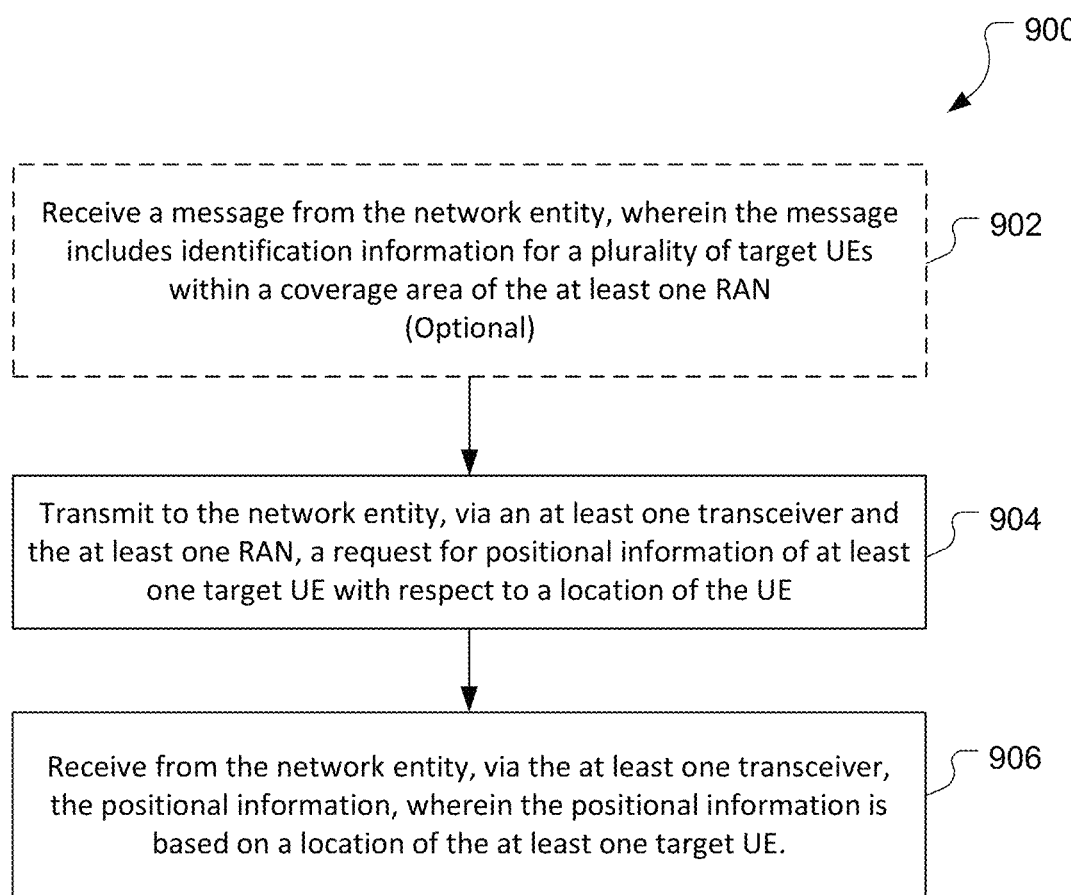

900

Receive a message from the network entity, wherein the message includes identification information for a plurality of target UEs within a coverage area of the at least one RAN
(Optional)

902

Transmit to the network entity, via an at least one transceiver and the at least one RAN, a request for positional information of at least one target UE with respect to a location of the UE

904

Receive from the network entity, via the at least one transceiver, the positional information, wherein the positional information is based on a location of the at least one target UE.

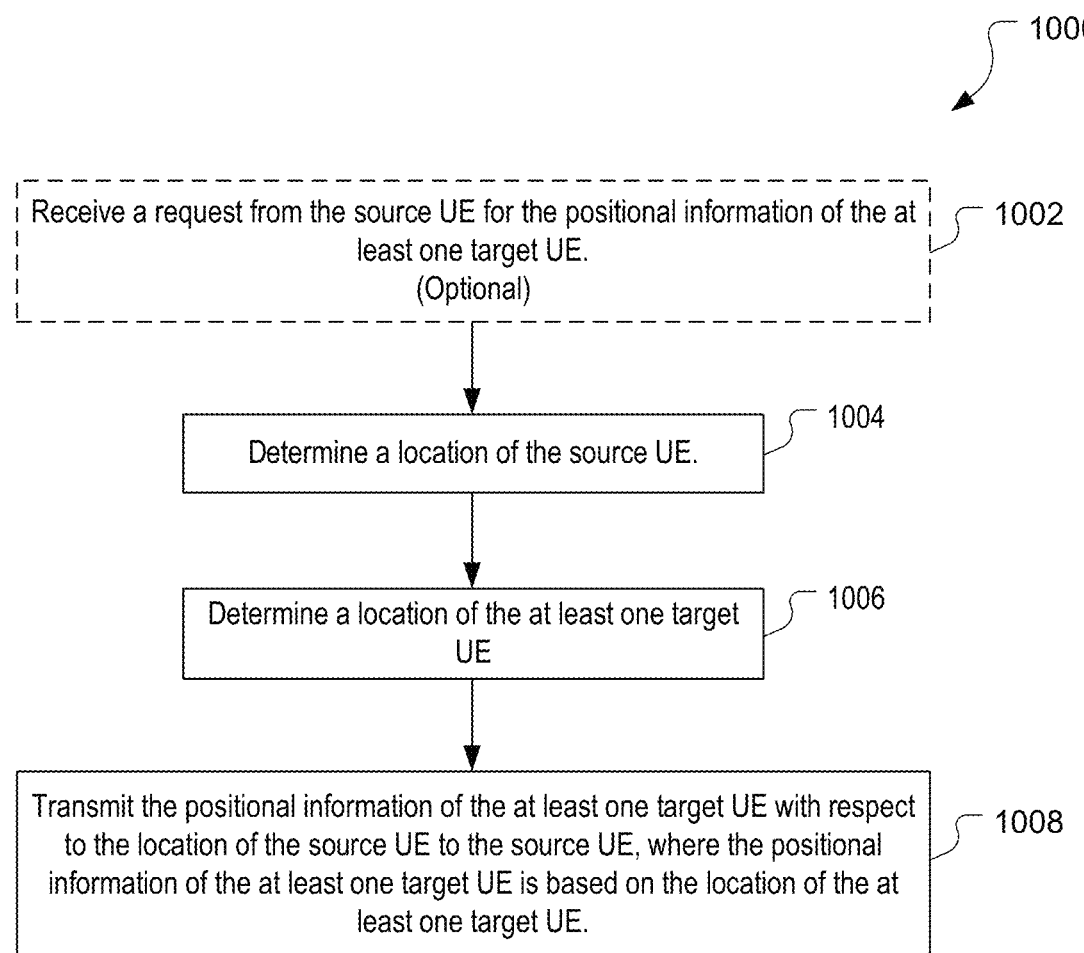

Receive a request from the source UE for the positional information of the at least one target UE.
(Optional)

1002

Determine a location of the source UE.

1004

Determine a location of the at least one target UE

1006

Transmit the positional information of the at least one target UE with respect to the location of the source UE to the source UE, where the positional information of the at least one target UE is based on the location of the at least one target UE.

VEHICLE-TO-EVERYTHING BASED USER EQUIPMENT TO USER EQUIPMENT RANGING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

At present, wireless vehicular communication systems are desirable for achieving higher levels of automated driving for certain vehicles utilizing cellular access technology known as vehicle-to-everything (also known as V2X) communication technology or direct access technology (known as DSRC (Dedicated Short-Range Communication)). In general, DSRC among vehicles utilizes a sidelink interface through the autonomous selection of radio resources of different vehicles; however, these DSRC approaches may be challenging because of the connectivity issues between different vehicles.

V2X technology generally involves high-bandwidth and low-latency communications that utilize sensors, cameras, and wireless connectivity, and allow vehicles to share real-time information with their drivers, other vehicles, pedestrians and roadway infrastructure like traffic lights. It is often desirable to be able to determine the location of one or more target vehicles relative to a source vehicle.

SUMMARY

An example of a user equipment (UE) in signal communication with a communication network having at least one radio access network (RAN) and an entity network according to the disclosure includes at least one transceiver, at least one memory, and at least one processor, coupled with the at least one transceiver and the at least one memory, the at least one processor configured to: transmit, over a radio interface, to a network entity of a communication network that includes at least one Radio Access Network (RAN), via the at least one transceiver, a request for positional information of at least one target UE with respect to a first location of the UE; and receive, over the radio interface, from the network entity, via the at least one transceiver, the positional information, wherein the positional information is based on a location of the at least one target UE.

An example method for determining a position of at least one target user equipment (UE) with respect to a source UE, wherein the source UE and at least one target UE are in communication with a communication network having at least one radio access network (RAN) and a network entity includes transmitting to the network entity, via at least one transceiver and the at least one RAN, a request for positional information of the at least one target UE with respect to a first location of the source UE; and receiving from the network entity, via the at least one transceiver, the positional information, wherein the positional information is based on a location of the at least one target UE.

An example network entity includes at least one transceiver; at least one memory; and at least one processor, coupled with the at least one transceiver and the at least one memory, the at least one processor configured to: determine a first location of a source user equipment (UE); determine a location of at least one target UE; and transmit, via the at least one transceiver, positional information of the at least one target UE with respect to the first location of the source UE to the source UE, wherein the positional information of the at least one target UE is based on the location of the at least one target UE.

Another example method for determining a position of at least one target user equipment (UE) with respect to a source UE with a network entity in communication with a communications network including determining a first location of the source UE; determining a location of the at least one target UE; and transmitting, via at least one transceiver, positional information of the at least one target UE with respect to the first location of the source UE to the source UE, wherein the positional information of the at least one target UE is based on the location of the at least one target UE.

Other devices, apparatuses, systems, methods, features, and advantages of the disclosure will be or will become apparent to one with skill in the art upon examination of the following figures and detailed description. It is intended that all such additional devices, apparatuses, systems, methods, features, and advantages be included within this description, be within the scope of the disclosure, and be protected by the accompanying claims.

BRIEF DESCRIPTION OF THE DRAWINGS

FIG. 9 is a block flow diagram of a method performed by a UE for determining a position of at least one target UE with respect to a source UE.

FIG. 10 is a block flow diagram of a method performed by a network entity for determining a position of at least one target UE with respect to a source UE.

DETAILED DESCRIPTION

Figure 1:
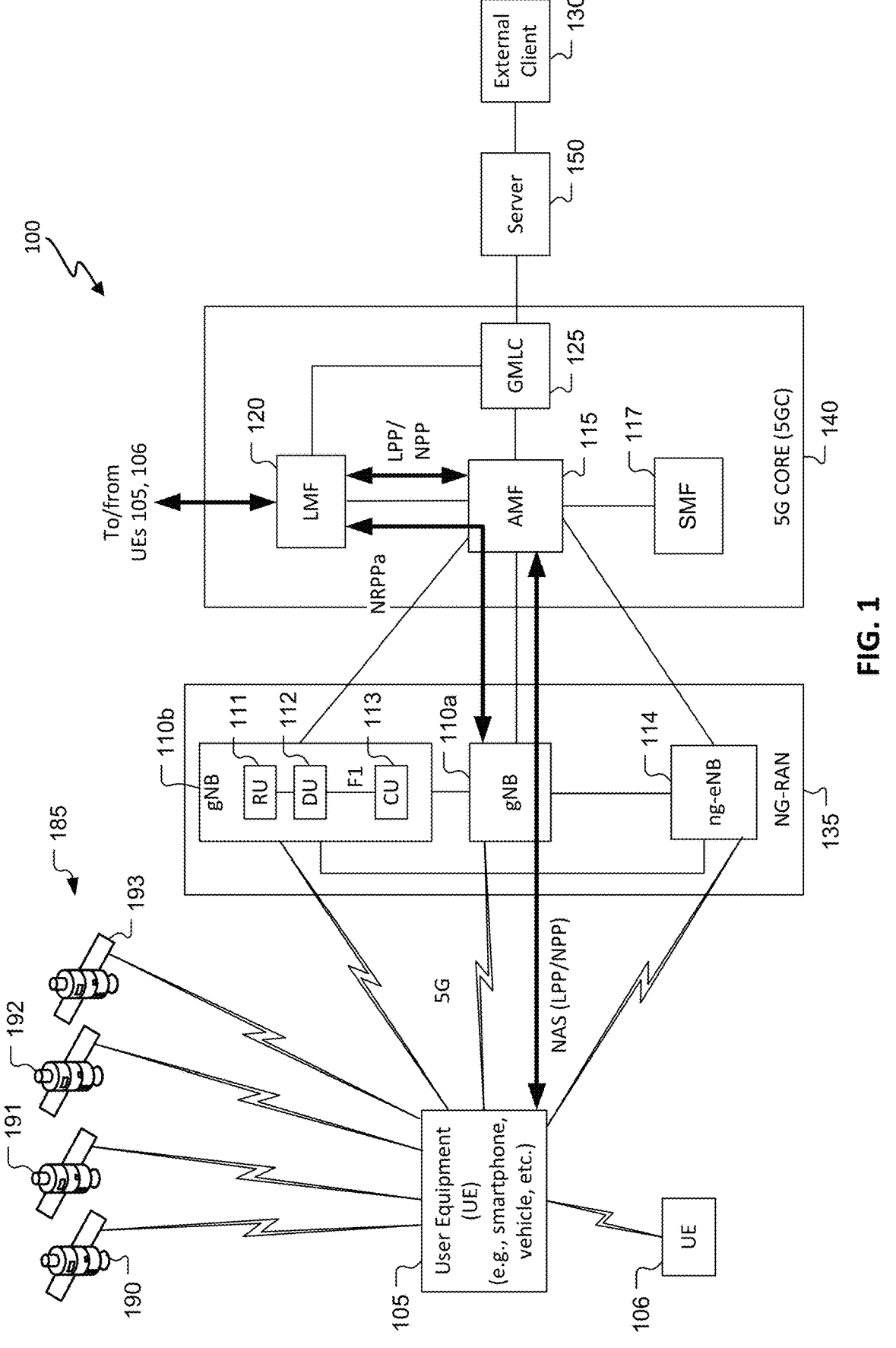
FIG. 1 is a simplified diagram of an example wireless communications system.

Techniques are discussed herein for providing vehicle-to-everything (V2X) and everything-to-vehicle (V2N2V) based UE-to-UE ranging. Discussed is an example of a system configured to provide V2N2V based UE-to-UE ranging between, for example, a source UE and the first target UE utilizing the first UE-to-network radio interface in communication with the source UE, at least one Radio Access Network (RAN), a network entity, a second UE-to-network radio interface in communication with the first target UE.

Examples in this disclosure may be used for sidelink positioning utilizing V2N2X signaling and protocols. More specifically, discussed is an example request for sidelink ranging with target UE(s) via a UE-to-network radio interface (e.g., a UMTS Air Interface (Uu), a LTE-Uu interface, a new radio Uu interface (NR-Uu), or a similar type radio interface) by a source UE. In this example, the source UE can provide a V2X identifier (ID) of a target UE in an LPP message with which it intends to perform ranging. The source UE may also, for example, provide a SUCI (Subscriber concealed identifier), GPSI (General Public Subscription Identifier) of a target UE that has a mapping to the V2X ID in the V2X system. Also discussed are example location Management Function (LMF) operations in response to the request from source UE that may include, for example, the LMF initiating a request to position the target UE and source UE by conventional uplink/downlink methods. In this example, the LMF may provide an outcome of range (from determined positions of source, target UE) to the source UE. The LMF may also, for example, explicitly provide the source UE ID in the positioning request of the LPP message to indicate to the target UE that the current positioning request is not at the request of network, but due to ranging a request from another V2X source UE. In this example, the LMF would provide the target UE an opportunity to participate or not in the ranging procedure with the source UE. Moreover, the target UE can, for example, also selectively indicate to the LMF to only share ranging outcome information to a specific set of initiator source UEs based on one or more criteria. This allows the target UE to discriminate as to which requesting, if any, source UEs to will receive the relative position or ranging of the target UE. In this example, the LMF may provide Uu relative position and ranging outcome information to the source UE based on privacy, preferences, or both indicated by the target UE. Other configurations, however, may be used.

Items and/or techniques described herein may provide one or more of the following capabilities, as well as other capabilities not mentioned. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such implementations, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some implementations, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other examples, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some examples, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
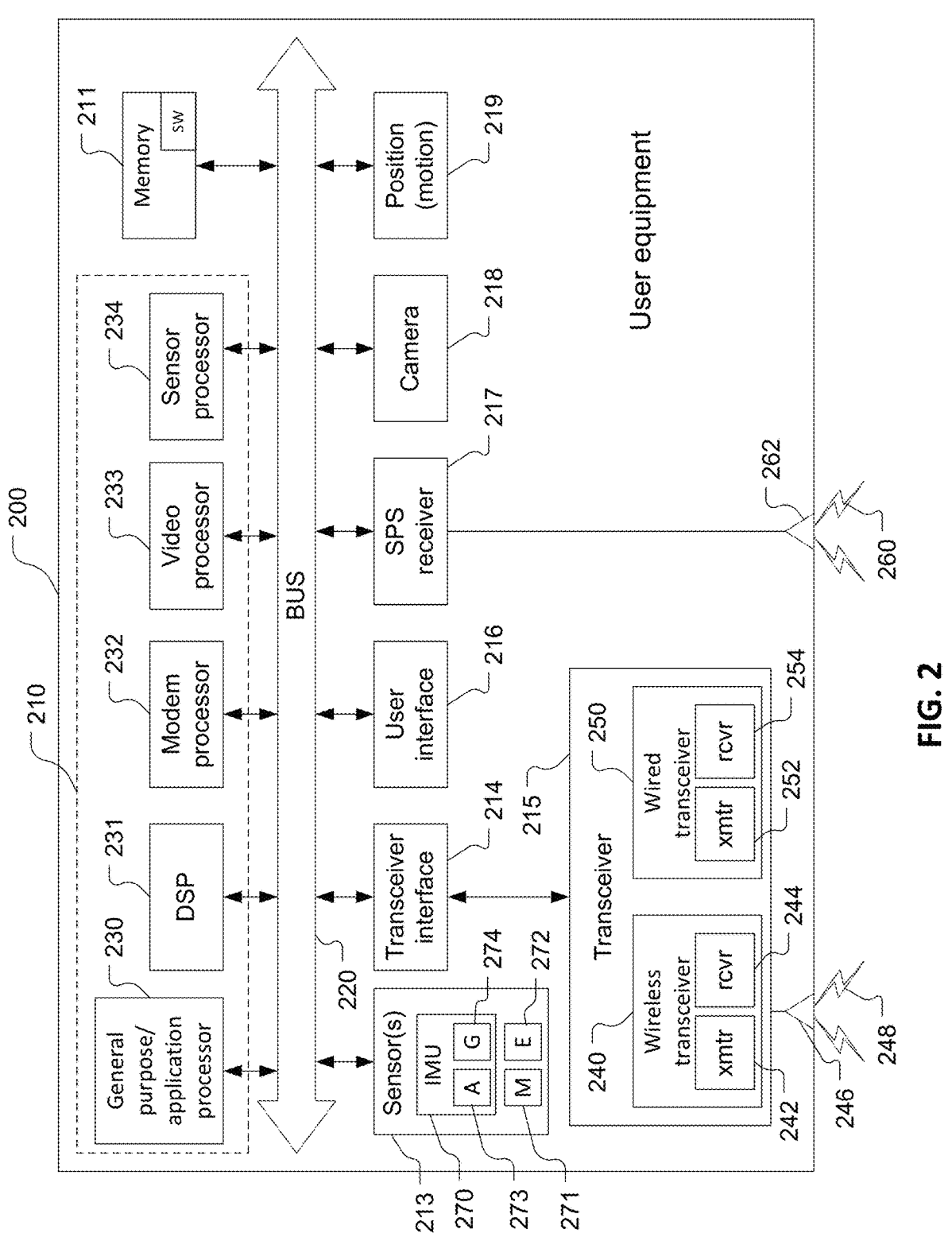
FIG. 2 is a system block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein.

Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
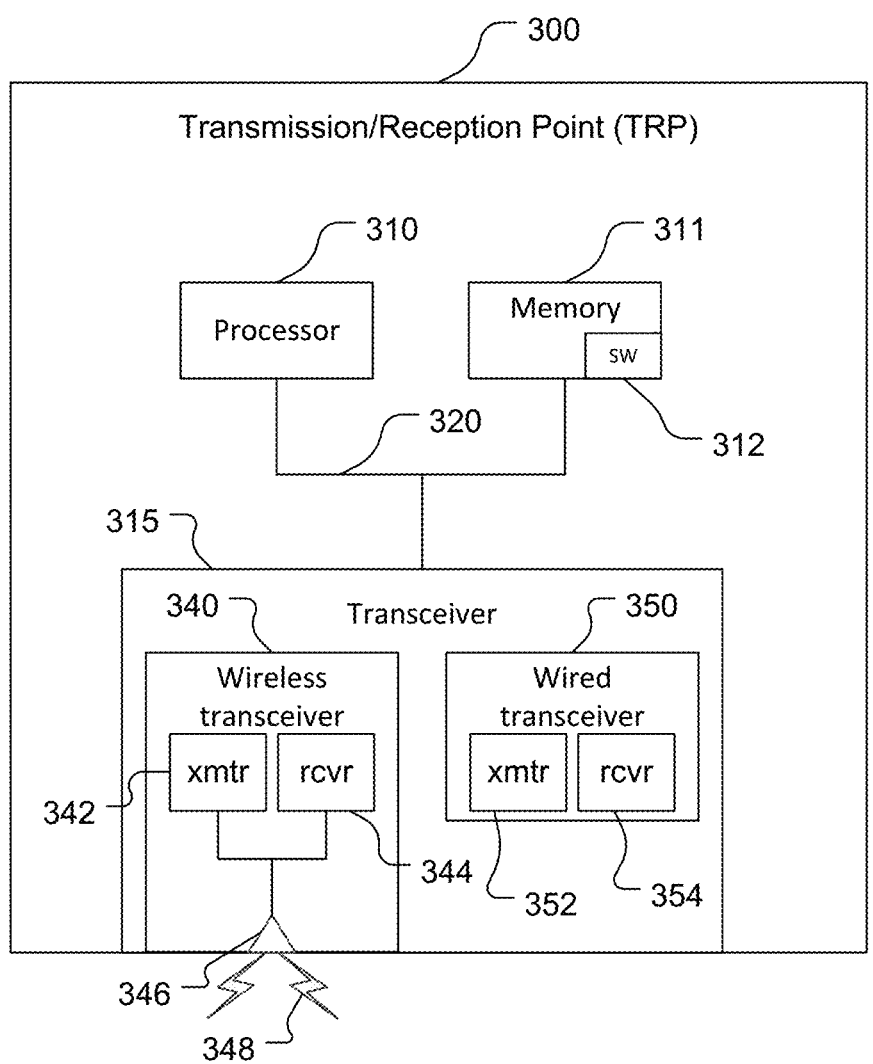
FIG. 3 is a system block diagram of components of an example transmission/reception point shown in FIG. 1.

Referring also to FIG. 3, an example of a TRP 300 of the gNBs 110a, 110b and/or the ng-eNB 114 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
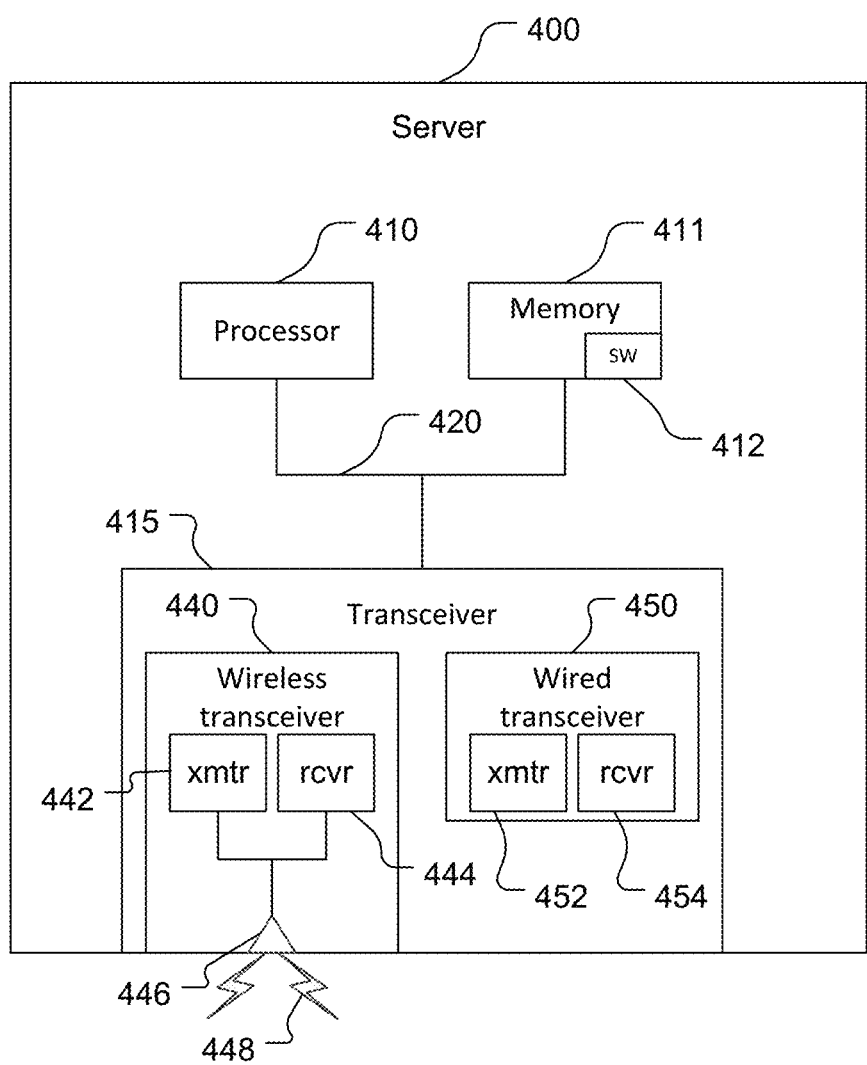
FIG. 4 is a system block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106.

For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{(Rx \to Tx)}$ (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference $T_{(Tx \to Rx)}$ between the transmission time of the RTT measurement signal from the base station and the ToA of the RTT response at the base station to the UE-reported time difference $T_{(Rx \to Tx)}$, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID)

transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance".

Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
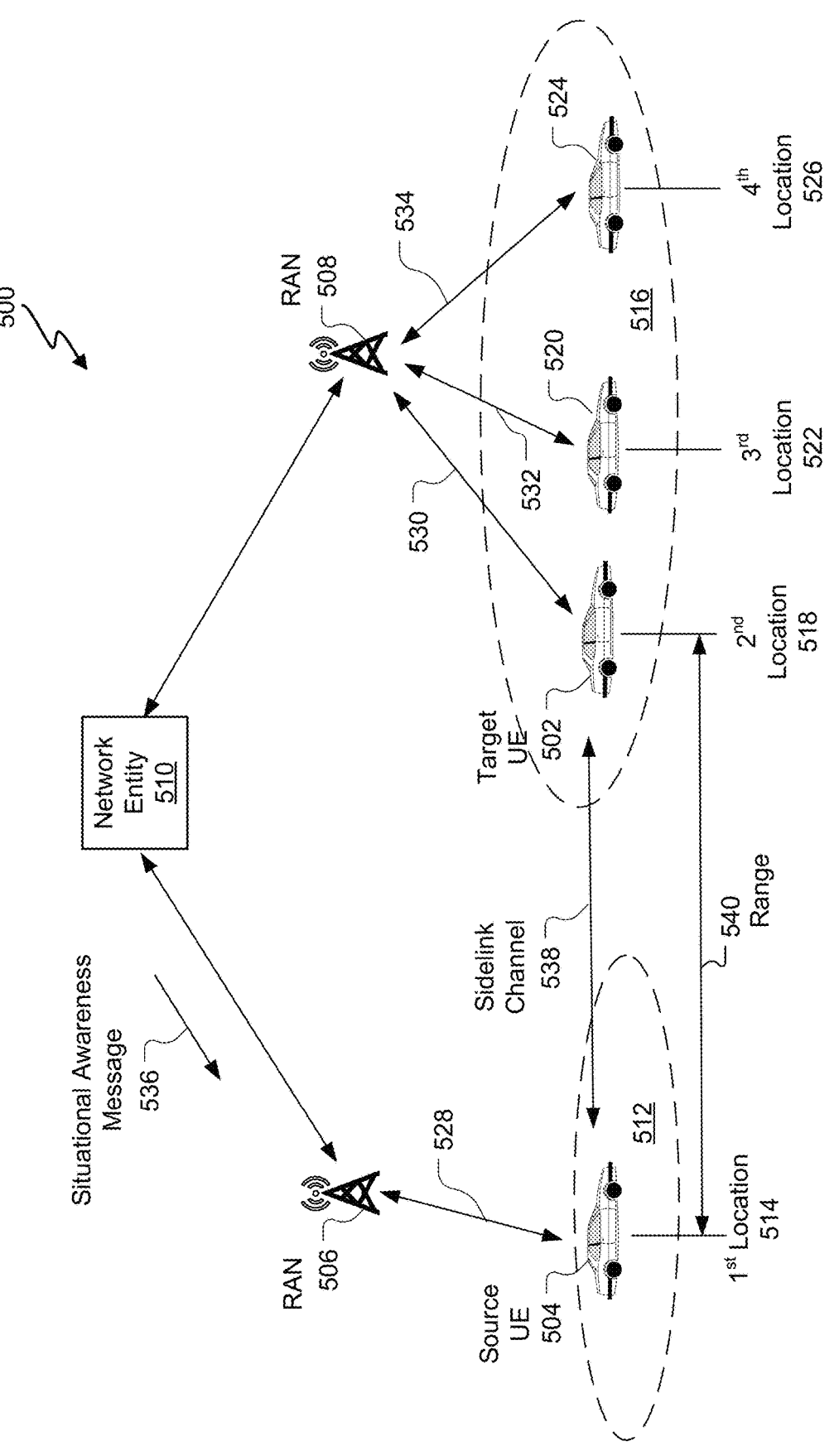
FIG. 5 is a system block diagram of a system for determining a position of at least one target UE with respect to a source UE utilizing at least two radio access networks (RANs).

Referring to FIG. 5, a block diagram of a system 500 for determining a position of at least one target UE (such as first target UE 502) with respect to a source UE 504 utilizing at least two radio access networks (RANs) 506 and 508 is shown. The system 500 may be configured to provide vehicle-to-everything (V2X) and everything-to-vehicle (V2N2V) based UE-to-UE ranging. In this example, the system 500 may include a network entity 510, the at least two RANs 506 and 508. The source UE 504 may be within a vehicle and may include at least one transceiver, at least one memory, and at least one processor, in signal communication with the at least one transceiver and the at least one memory. The source UE 504 may be a mobile device that may be physically integrated within the vehicle or a mobile device such as, for example, a cellular telephone, tablet, mobile computer, etc. that may be utilized by a user when the user utilizes the vehicle. The network entity 510 may also include at least one transceiver, at least one memory, at least one processor, in signal communication with the at least one transceiver and the at least one memory. In this example, the network entity 510 may be, for example, an LMF (as described earlier as LMF 120), a 5G Core (as described earlier as 5G Core 140 that includes an LMF 120), and/or a server (as described earlier as server 400 shown in FIG. 4). In this example, the first RAN 506 may be, for example, a cellular base station that communicates with UEs (including the source UE 504) within a first cellular coverage area 512. Additionally, in this example, the source UE 504 may be at a first location 514. The second RAN 508 may also be a cellular base station that communicates with other UEs within a second cellular coverage area 516. In this example, the second RAN 508 is in signal communication with a plurality of UEs that include, for example, a first target UE 502 at a second location 518, second target UE 520 at a third location 522, and third target 524 at a fourth location 526. The source UE 504 is in signal communication with the first RAN 506 via a first UE-to-network radio interface 528 (also generally referred to as "radio interface") and the target UEs 502, 520, and 524 are each individually in signal communication with the second RAN 508 via UE-to-network radio interfaces 530, 532, and 534, respectively. In this example, the UE-to-network radio interface may be, for example, a UMTS Air Interface (Uu), a LTE-Uu interface, a new radio Uu interface (NR-Uu), or a similar type radio interface. For ease of illustration, only three target UEs 502, 520, and 524 are shown but it is understood that there may be many more UEs within the second cellular coverage area 516. Additionally, in this example, each target UE 502, 520, and 524 are shown as being within different vehicles for purposes of illustration.

The circuits, components, modules, and/or devices of, or associated with, the network entity 510, the at least two RANs 506 and 508, the source UE 504, and the target UEs 502, 520, and 524 are described as being "in signal communication" (or interchangeably as "in communication") with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information may be passed from one circuit, component, module, and/or device to another in varying digital formats without passing through a direct electromagnetic connection.

In an example of operation from the source UE 504 perspective, the at least one processor within the source UE 504 is configured to transmit to the network entity 510 (via the at least one transceiver of the source UE 504) a request for positional information of at least one target UE with respect to the location 514 of the source UE 504. In this example, the at least one processor of the source UE 504 is configured to request the positional information of the first target UE 502; and transmit the request for positional information, via the at least one transceiver, over the first UE-to-network radio interface 528 of the first RAN 506 to the network entity 510. The at least one processor of the source UE 504 is also configured to receive the positional information from the network entity 510 via the first UE-to-network radio interface 528 of the first RAN 506 utilizing the at least one transceiver. In this example, the positional information is based on the location 518 of the first target UE 502.

The at least one processor of the source UE 504 may be further configured to receive a situational awareness message 536 from the network entity 510. The situational awareness message 536 includes identification information (e.g., a plurality of V2X identifications (IDs)) for the plurality of target UEs (including target UEs 502, 520, and 524) within the second cellular coverage area 516 of the second RAN 508. Once received, the at least one processor of the source UE 504 may be further configured to transmit the request for the positional information based on the identification information of the at least one target UE (i.e., the first target UE 502) of the plurality of target UEs. In this example, the at least one processor of the source UE 504 may be further configured to produce target identification data (i.e., a V2X ID for a specific target UE of the plurality of V2X IDs) and transmit the request for the positional information based on the target identification data (i.e., the V2X ID) where the V2X ID is based on previously acquired identification information. Alternatively, the at least one processor of the source UE 504 may also be configured to produce the target V2X ID and transmit to the first target UE 502 a request for direct positional information from the first target UE 502 (via the at least one transceiver and a sidelink channel 538) utilizing the V2X ID.

In this example, the positional information of the first target UE 502 may be the actual location 518, a relative position, and/or a range from the location of the source UE 504. As an example based on potential privacy or security concerns that may be imposed on the system 500, the network entity 510 may be configured to not provide the actual location 518 of the target UE 502 to the source UE 504 but, instead, only provide a relative position of the target UE 502 with respect to the location 514 of the source UE 504. In is example, the positional information includes the relative position of the first target UE 502 with respect to the location 514 of the source UE 504. The at least one processor of the source UE 502 may be further configured to receive a range 540 between the location 518 of the first target UE 504 and the location 514 of the source UE 504. In this example, the positional information may also include the range 540 between the location 518 of the first target UE 502 and the location 514 of the source UE 504.

Turning to the network entity 510, the at least one processor of the network entity 510 is configured to determine the locations 514 and 518 of the source UE 504 and the target UE 502, respectively, and transmit (via the at least one transceiver of the network entity 510) the positional information of the target UE 502 (with respect to the location 514 of the source UE 504) to the source UE 504. The at least one processor of the network entity 510 may also be configured to receive, via the at least one transceiver, a request from the source UE 504 for the positional information of the target UE 502; and, in response to receiving the request, determine the location 518 of the first target UE 502 and to transmit the positional information to the source UE 504. The at least one processor of the network entity 510 may further be configured to generate identification information for a plurality of target UEs (including the first target UE 502, second target UE 520, and third target UE 524) within the second coverage area 516 of the second RAN 508; and transmit, via the at least one transceiver of the network entity 510, the situational awareness message 536 to the source UE 504, where the situational awareness message 536 includes the identification information. In this example, the request from the source UE 504 for the positional information of the first target UE 502 may be based on the identification information of the first target UE 502 of the plurality of target UEs within the second coverage area 516.

In this example, the at least one processor of the network entity 510 may also be configured to determine range data based on the location 514 of the source UE 504 and the location 518 of the first target UE 502; and determine a relative position of the first target UE 502 with respect to the location 514 of the source UE 504. In this example, as described previously, the positional information of the first target UE 502 may include the range data and the relative position of the first target UE 502.

In these examples, the relative position of the first target UE 502 is an approximate location of first target UE 502 that is approximately the same as the actual location 518 of the first target UE 502. In this example, the network entity 510 may decide to only provide the relative position of the first target UE 502 because of privacy and/or security concerns that are associated with the system 500 and may be related to the first target UE 502.

The at least one processor of the network entity 510 may also be configured to determine actual position, relative positions, and ranges for other target UEs (e.g., the second target UE 520 and third target UE 524) within the second coverage area 516. In this example, the at least one processor of the network entity 510 may also be configured to determine the location 514 of the first target UE 504 (as described earlier), the location 522 of the second target UE 520, and optionally locations of other target UE (e.g., the third target 524 at location 526) within the second coverage area 516. In this example, the positional information produced by the network entity 510 may include actual or relative positions of the second target UE 520 and, optionally, the actual or relative positions of other target UEs within the second coverage area 516. Additionally, the positional information may include a first range data and a second range data for the first target UE 502 and second target UE 520, respectively. The at least one processor of the network entity 510 may be further configured to determine the location 518 of the first target UE 502 utilizing first location data received and the location 522 of the second target UE 520 utilizing second location data received.

As such, the system 500 is configured to provide V2N2V based UE-to-UE ranging between, for example, the source UE 504 and the first target UE 502 utilizing the first UE-to-network radio interface 528 in signal communication with the source UE 504, first RAN 506, network entity 510, second RAN 508, and a second UE-to-network radio interface 530 in signal communication with the first target UE 502. In this example, the network entity 510 initiates a request to position the first target UE 502 and source UE 504 by conventional uplink/downlink methods via the first UE-to-network radio interface 528 and the second UE-to-network radio interface 530. Thereafter, the network entity 510 provides the outcome of range (from the determined positions of the source UE 502 and first target UE 502) to the source UE 504.

In this example, the source UE 504 may or may not be interested in the absolute position of first target UE 502 (i.e., location 518) but may be only interested in the relative position of first target UE 502 with respect to the location 514 of the source UE 504. In this example, at the request of the source UE 504, the network entity 510 may provide the range 540 between the source UE 504 and first target UE 502 and the relative position of source UE 504 with respect to the first target UE 502, without revealing the actual position of the first target UE 502 (i.e., location 518).

More specifically, the network entity 510 may perform conventional positioning of the source UE 504 and all the target UE(s) (e.g., the location 518 of the first target UE 502, the location 522 of the second target UE 520, and the location 526 of the third target UE 524) requested by the source UE 504. The network entity 510 may then determine the relative position of one or more target UEs with respect to the source UE 504. In this example, determining a relative position includes determining one or more range of azimuth/elevation angles such as, for example, between [$T_1$, $T_2$], without specifically indicating the absolute azimuth/elevation to maintain secrecy/privacy. The network entity 510 may then determine the relative range between the source UE 504 and all the target UE(s) based on the above. As an example, the first target UE 502 may be at an angle of 20 degrees of azimuth with respect to the source UE 504. This information may be disclosed to the source UE 504 without revealing the position (i.e., location 518) of the first target UE 502 to the source UE 504.

If there are no privacy or security issues associated with the system 500, the network entity 510 may also optionally provide the actual position (i.e., location 518) of the first target UE 502. As an example, the system 500 may be utilized to update existing Uu networks to provide V2X services.

In these examples, the network entity 510 initiates a positioning request for a first UE (i.e., the target UE 502) at the request of a second UE (i.e., the source UE 504). This is different from known approaches where a first UE or second UE requests to position itself, or a network independently determines to position a first UE or second UE. In these examples, the network entity 510 provides the source UE 504 V2X ID in the positioning request of, for example, an LPP message to indicate to the first target UE 502 that the current positioning request is not at the request of network entity 510, but due to a ranging request from another UE (e.g., the source UE 504). This provides the first target UE 502 an opportunity to participate or not in the ranging procedure. This process may be extended to the other target UEs within the second coverage area 516 of the second RAN 508. In this example, the first target UE 502 may indicate to the network entity 510 that it only desires to share ranging information with a specific set of initiator UEs (e.g., source UE 504).

The system 500 may also be configured to provide sidelink channel 538 ranging with a target UE (e.g., the first target UE 502) by the source UE 504 via the first UE-to-network radio interface 528 and the second UE-to-network radio interface 530. In this example, the source UE 504 may provide the ranging request with the first target UE 502 via LPP in one or more of the following examples. As an example, the source UE 504 may provide the V2X ID of the first target UE 502 in the LPP message with which the source UE 504 intends to perform ranging. As discussed earlier, in this example, the V2X ID of the first target UE 502 may be known to the source UE 504 via the situational awareness message 536 transmitted by the network entity 510 to the plurality of UEs in its coverage area(s) (e.g., the first coverage area 512 and the second coverage area 516). As another example, the source UE 504 may provide a SUCI (Subscriber Concealed Identifier) or GPSI (General Public Subscription Identifier) of the first target UE 502 that has a mapping to the V2X ID of the first target UE 502 in system 500 (e.g., in the network entity 510, core network (5GC)

140, LMF 120, gNB, etc.). In one example, the source UE may already be aware of this information from a prior communication with the first target UE 502 or as a part of a platooning operation (i.e., where a group of vehicles move synchronously) where the plurality of target UEs are known apriori.

In this example, once the ranging request has been accepted by the first target UE 502, the ranging information between the first target UE 502 and source UE 504 may be communicated via the sidelink channel 538 between the first target UE 502 and source UE 504. This process may be extended to other ranging requests from the source UE 504 to other target UEs (e.g., second target UE 520 and third target UE 524).

The system 500 may optionally apply privacy and security measures by providing relative positions and ranges instead of actual locations of target UEs to the source UE 504 (as described earlier) and/or implementing privacy setting that allow individual UEs within the system 500 to disable the transmission of their location information to requesting source UEs (e.g., source UE 504). For example, the at least one processor of the network entity 510 may be configured to determine whether the location (e.g., location 518) of the at least one target UE (e.g., the first target UE 502) is private, and disable a transmission of the positional information of the first target UE 502 to the source UE 504 based on the location 518 of the first target UE 502 being private as optionally designed by the first target UE 502. In this example, the at least one processor of the network entity 510 may be configured to receive a request from the source UE 504 for the location 518 of the first target UE 502, where the request includes source identification data (i.e., the source V2X ID) of the source UE 504 and the source V2X ID identifies the source UE 504. Once received, the at least one processor of the network entity 510 may be configured to transmit the request from the source UE 504 to the first target UE 502, and receive a denial message from the first target UE 502 based on the source V2X ID of the source UE 504. The at least one processor of the network entity 510 may be configured to determine that the location 518 of the first target UE 502 is private based on the denial message from the first target UE 502.

Figure 6:
FIG. 6 is a message diagram of an example network assisted positioning procedure for determining the position of at least one target UE with respect to a source UE utilizing the system shown in FIG. 5.

FIG. 6 is a message diagram 600 of an example network assisted positioning procedure for determining the position of at least one target UE (i.e., the first target UE 502) with respect to the source UE 504 utilizing the system 500 shown in FIG. 5. In this example, the source UE 504 requests 602 V2N2V based UE-to-UE ranging with the first target UE 502 from the network entity 510 via the first UE-to-network radio interface 528 through the first RAN 506. The network entity 510 receives the request 602 from the source UE 504 and transmits 604 (i.e., forwards) the request, from the source UE 504, to the first target UE 502. The requests 602 and 604 include the V2X ID for the first target UE 502 that was provided by the source UE 504. If the first target UE 502 decides to provide the positional information to source UE 504, the first target UE 502 and network entity 510 will communicate to provide the positional information of the first target UE 502 to the source UE 504. The network entity 510 will receive position related information from the first target UE 502 and determine 606 the positional information of the first target UE 502. The network entity 510 will determine 608 the location 514 of the source UE 504. In this example, the determination 608 may be optionally performed by the network entity 510 either before or after determining 606 the positional information of the first target UE 502. The network entity 510 then determines 610 the range 540 between the location 514 of the source UE 504 and the location 518 of the target UE 502. The positional information is then transmitted 612 to the source UE 504 via the RAN 506.

Figure 7:
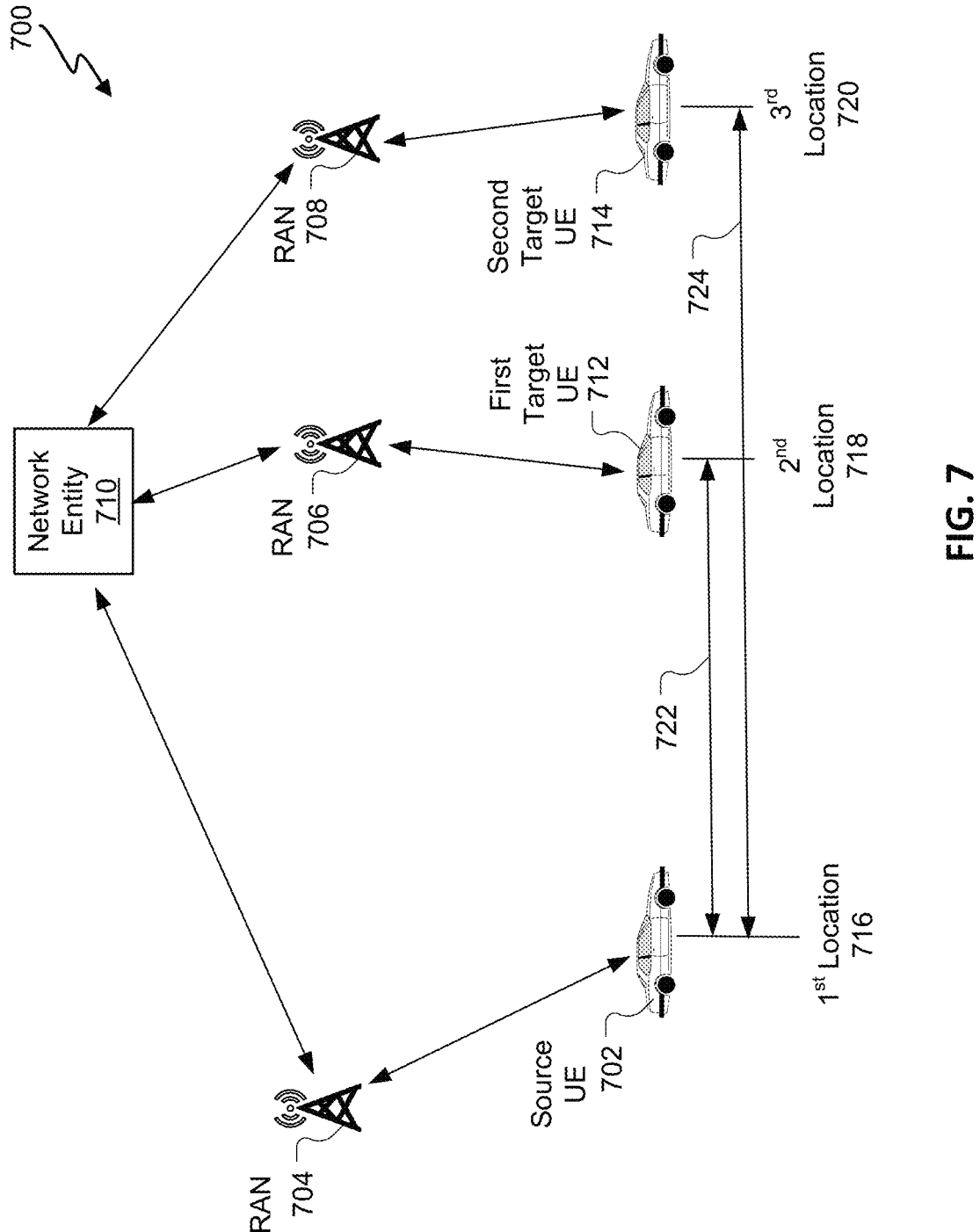
FIG. 7 is a system block diagram of a system for determining a position of at least one target UE with respect to a source UE utilizing at least three RANs.

Turning to FIG. 7, a block diagram of a system 700 for determining a position of at least one target UE with respect to a source UE 702 utilizing at least three RANs 704, 706, and 708 is shown. In this example, the system 700 includes a network entity 710, the first RAN 704, the second RAN 706, and the third RAN 708. Unlike the example shown in relation to FIG. 5, in this example, the source UE 702 is in signal communication with a first RAN 704, a first target UE 712 is in signal communication with the second RAN 706, and a second target UE 714 is in signal communication with the third RAN 708. In this example, the source UE 702 is located at location 716, the first target UE 712 is located at location 718, and the third target UE 714 is located at location 720. The system 700 is configured to operate in a similar fashion to the system 500 described earlier in relation to FIG. 5, except that system 700 includes and utilizes three RANs 704, 706, and 708, instead of two RANs 506 and 508 described earlier. Similar to the previous discussion, the system 700 is configured to produce a first range 722 between the location 716 of the source UE 702 and the location 718 of the first target UE 712 and a second range 724 between the location 716 of the source UE 702 and the location 720 of the second target UE 714.

Figure 8:
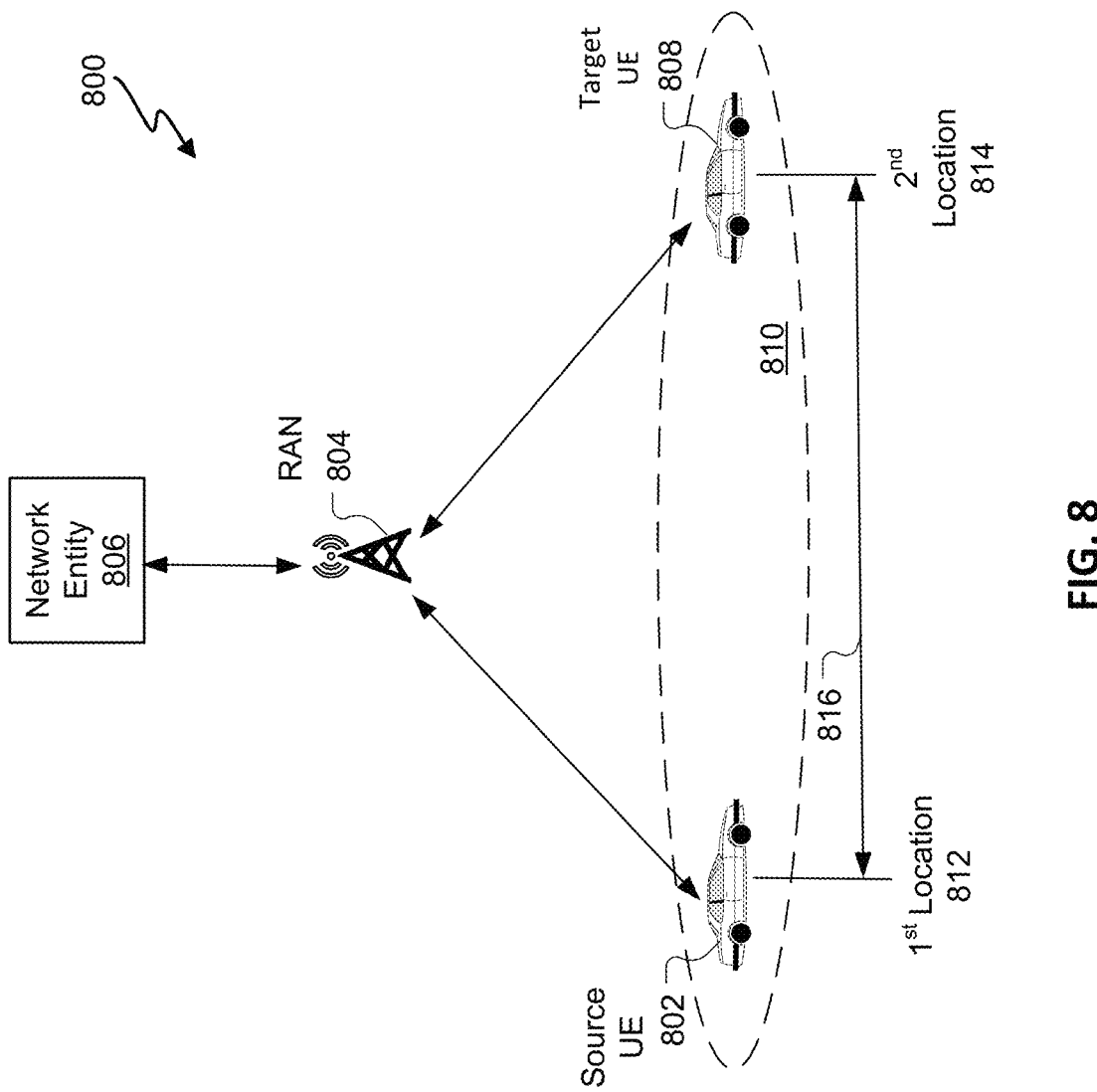
FIG. 8 is a system block diagram of a system for determining a position of at least one target UE with respect to a source UE utilizing a single RAN.

In FIG. 8, a block diagram of a system 800 for determining a position of at least one target UE with respect to a source UE 802 is shown utilizing a single RAN 804. In this example, the system 800 includes a network entity 806 and the single RAN 804. Unlike the examples shown in relation to FIGS. 5 and 7, in this example, the source UE 802 is in signal communication with the same RAN 804 as a first target UE 808. In this example, the RAN 804 has a coverage area 810 that includes both the source UE 802 and the first target UE 808; and the source UE 802 is located at location 812 within the coverage area 810 and the first target UE 808 is located at location 814 within the coverage area 810. The system 800 is configured to operate in a similar fashion to the systems 500 and 700 described earlier in relation to FIGS. 5 and 7, except that system 800 includes and utilizes only a single RAN 804, instead of a plurality of RANs as described earlier. Similar to the previous discussion, the system 800 is configured to produce a range 816 between the location 812 of the source UE 802 and the location 814 of the target UE 808.

From the examples described in relation to FIGS. 5, 7, and 8, the systems 500, 700, or 800 all include a network entity and at least one RAN in signal communication with the source UE and at least one target UE. The one or more RANs may include one or more coverage areas where the source UE and at least one target UE are located. As discussed, the one or more target UEs may be optionally located with a single coverage area of a single RAN or in different coverage areas of different RANs. The source UE may be located optionally within the same coverage area of one or more target UEs or in a separate coverage area remote from the at least one target UE.

Turning to FIG. 9, a block flow diagram of a method 900 performed by a UE for determining a position of at least one target UE with respect to a source UE utilizing V2N2V based UE-to-UE ranging. The method 900 may begin by optionally receiving 902, at the source UE, a message (e.g., the situational awareness message 536) from the network entity, where the message includes identification information for a plurality of target UEs within a coverage area of the at least one RAN. The method 900 then includes transmitting 904 to the network entity, via an at least one transceiver and the at least one RAN, a request for positional information of the at least one target UE with respect to a location of the UE and receiving 906 from the network entity, via the at least one transceiver, the positional information, where the positional information is based on a location of the at least one target UE.

In FIG. 10, a block flow diagram of a method 1000 performed by a network entity for determining a position of at least one target UE with respect to a source UE is shown. The method 1000 begins by optionally receiving 1002 a request from the source UE for the positional information of the at least one target UE. The method 1000 then determines 1004 a location of the source UE and determines 1006 a location of the at least one target UE. The method 1000 then transmits 1008, via at least one transceiver, the positional information of the at least one target UE with respect to the location of the source UE to the source UE, wherein the positional information of the at least one target UE is based on the location of the at least one target UE.

IMPLEMENTATION EXAMPLES

Implementation examples are provided in the following numbered clauses.

Clause 1. A user equipment (UE) comprising: at least one transceiver; at least one memory; and at least one processor, coupled with the at least one transceiver and the at least one memory, the at least one processor configured to: transmit, over a radio interface, to a network entity of a communication network that includes at least one Radio Access Network (RAN), via the at least one transceiver, a request for positional information of at least one target UE with respect to a first location of the UE; and receive, over the radio interface, from the network entity, via the at least one transceiver, the positional information, wherein the positional information is based on a location of the at least one target UE.

Clause 2. The UE of clause 1, wherein the at least one processor is further configured to receive at least one message from the network entity, the at least one message includes identification information for one or more target UEs within a coverage area of the at least one RAN, and the at least one processor is configured to transmit the request for the positional information based on the identification information of the at least one target UE of the one or more target UEs.

Clause 3. The UE of clause 2, wherein the at least one processor is further configured to generate target identification data, wherein the target identification data is based on previously acquired identification information, and transmit the request for the positional information based on the target identification data.

Clause 4. The UE of clause 2, wherein the at least one processor is further configured to generate target identification data, wherein the target identification data is based on previously acquired identification information, and transmit to the at least one target UE, via the at least one transceiver, via a sidelink channel utilizing the target identification data, a request for direct positional information from the at least one target UE.

Clause 5. The UE of clause 1, wherein the at least one processor is further configured to transmit to the network entity, via the at least one transceiver, a request for confidentiality of the first location of the UE.

Clause 6. The UE of clause 1, wherein the at least one processor is further configured to receive a request from the network entity, via the at least one transceiver, for the first location of the UE, the request includes source identification data of a requesting UE and the source identification data is configured to identify the requesting UE to the UE, the at least one processor is further configured to transmit a denial message to the network entity, and the denial message denies transmitting the first location of the UE to the requesting UE based on the source identification data.

Clause 7. The UE of clause 1, wherein the at least one processor is configured to receive a relative position of the at least one target UE with respect to the first location of the UE, and the relative position of the at least one target UE with respect to the first location of the UE is included in the positional information.

Clause 8. The UE of clause 1, wherein the at least one processor is further configured to receive a range between the at least one target UE and the first location of the UE, and the range between the at least one target UE and the first location of the UE is included in the positional information.

Clause 9. A method for determining a position of at least one target user equipment (UE) with respect to a source UE, wherein the source UE and at least one target UE are in communication with a communication network having at least one radio access network (RAN) and a network entity, the method comprising: transmitting to the network entity, via at least one transceiver and the at least one RAN, a request for positional information of the at least one target UE with respect to a first location of the source UE; and receiving from the network entity, via the at least one transceiver, the positional information, wherein the positional information is based on a location of the at least one target UE.

Clause 10. The method of clause 9, further comprises receiving at least one message from the network entity, wherein the at least one message includes identification information for one or more target UEs within a coverage area of the at least one RAN, and transmitting the request for the positional information based on the identification information of the at least one target UE of the one or more target UEs.

Clause 11. The method of clause 10, further comprises generating target identification data, wherein the target identification data is based on previously acquired identification information, and transmitting the request for the positional information based on the target identification data.

Clause 12. The method of clause 10, further comprises generating target identification data, wherein the target identification data is based on previously acquired identification information, and transmitting to the at least one target UE, via the at least one transceiver, a request for direct positional information from the at least one target UE via a sidelink channel utilizing the target identification data.

Clause 13. The method of clause 9, further comprises transmitting to the network entity, via the at least one transceiver, a request for confidentiality of the first location of the UE.

Clause 14. The method of clause 9, further comprises receiving a request from the network entity, via the at least one transceiver and the at least one RAN, for the first location of the source UE, and wherein the request includes source identification data of a requesting UE and the source identification data is configured to identify the requesting UE to the source UE.

Clause 15. The method of clause 14, further comprises transmitting a denial message to the network entity, and wherein the denial message denies transmitting the first location of the source UE to the requesting UE based on the source identification data.

Clause 16. The method of clause 9, further comprises receiving a relative position of the at least one target UE with respect to the first location of the source UE, and wherein the relative position of the at least one target UE with respect to the first location of the source UE is included in the positional information.

Clause 17. The method of clause 9, further comprises receiving a range between the at least one target UE and the first location of the source UE, and wherein the range between the at least one target UE and the first location of the source UE is included in the positional information.

Clause 18. The method of clause 9, further comprises transmitting to the network entity, via the at least one transceiver and the at least one RAN, source identification data of the UE, wherein the source identification data is configured to identify the source UE to the at least one target UE.

Clause 19. The method of clause 18, wherein the positional information includes a denial message if the at least one target UE denies transmitting a position of the at least one target UE to the source UE based on the source identification data.

Clause 20. A user equipment (UE) for determining a position of at least one target user equipment (UE) with respect to the UE, wherein the UE and at least one target UE are configured to communicate with a communication network having at least one radio access network (RAN) and a network entity, the UE comprising: means for transmitting to the network entity, via the at least one RAN, a request for positional information of the at least one target UE with respect to a first location of the UE; and means for receiving from the network entity the positional information, wherein the positional information is based on a location of the at least one target UE.

Clause 21. The UE of clause 20, further comprising means for receiving a situational awareness message from the network entity, wherein the situational awareness message includes identification information for a plurality of target UEs within a coverage area of the at least one RAN, and means for transmitting the request for the positional information based on the identification information of the at least one target UE of the plurality of target UEs.

Clause 22. The UE of clause 20, further comprising means for generating target identification data, wherein the target identification data is based on previously acquired identification information, and means for transmitting the request for the positional information based on the target identification data.

Clause 23. The UE of clause 20, further comprising means for generating target identification data, wherein the target identification data is based on previously acquired identification information, and means for transmitting to the at least one target UE a request for direct positional information from the at least one target UE via a sidelink channel utilizing the target identification data.

Clause 24. The UE of clause 20, further comprising means for transmitting to the network entity a request for confidentiality of the first location of the UE.

Clause 25. The UE of clause 20, further comprising means for receiving a request from the network entity for the first location of the UE, and wherein the request includes source identification data of a requesting UE and the source identification data is configured to identify the requesting UE to the UE.

Clause 26. The UE of clause 25, further comprising means for transmitting a denial message to the network entity, and wherein the denial message denies transmitting the first location of the UE to the requesting UE based on the source identification data.

Clause 27. The UE of clause 20, further comprising means for receiving a relative position of the at least one target UE with respect to the first location of the UE, and wherein the relative position of the at least one target UE with respect to the first location of the UE is included in the positional information.

Clause 28. The UE of clause 27, further comprising means for receiving a range between the at least one target UE and the first location of the UE, and wherein the range between the at least one target UE and the first location of the UE is included in the positional information.

Clause 29. The UE of clause 20, further comprising means for transmitting, to the network entity, source identification data of the UE, wherein the source identification data is configured to identify the UE to the at least one target UE, and the positional information includes a denial message if the at least one target UE denies transmitting a position of the at least one target UE to the UE based on the source identification data.

Clause 30. A non-transitory processor-readable storage medium comprising processor-readable instructions configured to cause one or more processors to determine a position of at least one target user equipment (UE) with respect to a source UE, comprising: code for transmitting, over a radio interface, to a network entity of a communication network that includes at least one Radio Access Network (RAN), via an at least one transceiver, a request for positional information of at least one target UE with respect to a first location of the source UE; and code for receiving, over the radio interface, from the network entity, via the at least one transceiver, the positional information, wherein the positional information is based on a location of the at least one target UE.

Clause 31. The non-transitory processor-readable storage medium of clause 30, further comprising code for to receiving a situational awareness message from the network entity, wherein the situational awareness message includes identification information for a plurality of target UEs within a coverage area of the at least one RAN, and code for transmitting the request for the positional information based on the identification information of the at least one target UE of the plurality of target UEs.

Clause 32. The non-transitory processor-readable storage medium of clause 30, further comprising code for generating target identification data, wherein the target identification data is based on previously acquired identification information, and code for transmitting the request for the positional information based on the target identification data.

Clause 33. The non-transitory processor-readable storage medium of clause 30, further comprising code for generating target identification data, wherein the target identification data is based on previously acquired identification information, and code for transmitting to the at least one target UE, via the at least one transceiver, a request for direct positional information from the at least one target UE via a sidelink channel utilizing the target identification data.

Clause 34. The non-transitory processor-readable storage medium of clause 30, further comprising code for transmitting to the network entity, via the at least one transceiver, a request for confidentiality of the first location of the UE.

Clause 35. The non-transitory processor-readable storage medium of clause 30, further comprising code for receiving a request from the network entity, via the at least one transceiver and the at least one RAN, for the first location of the source UE, and wherein the request includes source identification data of a requesting UE and the source identification data is configured to identify the requesting UE to the source UE.

Clause 36. The non-transitory processor-readable storage medium of clause 35, further comprising code for transmitting a denial message to the network entity, and wherein the denial message denies transmitting the first location of the source UE to the requesting UE based on the source identification data.

Clause 37. The non-transitory processor-readable storage medium of clause 30, further comprising code for receiving a relative position of the at least one target UE with respect to the first location of the source UE, and wherein the relative position of the at least one target UE with respect to the first location of the source UE is included in the positional information.

Clause 38. The non-transitory processor-readable storage medium of clause 37, further comprising code for receiving a range between the at least one target UE and the first location of the source UE, and wherein the range between the at least one target UE and the first location of the source UE is included in the positional information.

Clause 39. The non-transitory processor-readable storage medium of clause 30, further comprising code for transmitting to the network entity, via the at least one transceiver and the at least one RAN, source identification data of the UE, wherein the source identification data is configured to identify the source UE to the at least one target UE, and the positional information includes a denial message if the at least one target UE denies transmitting a position of the at least one target UE to the source UE based on the source identification data.

Clause 40. A network entity comprising: at least one transceiver; at least one memory; at least one processor, coupled with the at least one transceiver and the at least one memory, the at least one processor configured to: determine a first location of a source user equipment (UE); determine a location of at least one target UE; and transmit, via the at least one transceiver, positional information of the at least one target UE with respect to the first location of the source UE to the source UE, wherein the positional information of the at least one target UE is based on the location of the at least one target UE.

Clause 41. The network entity of clause 40, wherein the at least one processor is further configured to determine at least (a) range data based on the first location of the source UE and the location of the at least one target UE, or (b) a relative position of each of the at least one target UE with respect to the first location of the source UE, and the positional information of the at least one target UE further includes the range data, the relative position of the at least one target UE, or both.

Clause 42. The network entity of clause 40, wherein the at least one processor is further configured to receive, via the at least one transceiver, a request from the source UE for the positional information of the at least one target UE, determine the location of the at least one target UE, and transmit the positional information to the source UE.

Clause 43. The network entity of clause 42, wherein the at least one processor is further configured to generate identification information for one or more target UEs within a coverage area of an at least one radio access network (RAN), wherein the one or more target UEs includes the at least one target UE, and transmit, via the at least one transceiver, at least one message to the source UE, wherein the at least one message includes the identification information.

Clause 44. The network entity of clause 43, wherein the at least one target UE includes a first target UE and a second target UE, the at least one processor is further configured to determine a second location of the first target UE, determine a third location of the second target UE, determine first range data based on the first location of the source UE and the second location of the first target UE, determine second range data based on the first location of the source UE and the third location of the second target UE, and the positional information of the at least one target UE includes the first range data and the second range data.

Clause 45. The network entity of clause 44, wherein the at least one processor is further configured to: determine a first relative position of the first target UE with respect to the first location of the source UE; and determine a second relative position of the first target UE with respect to the first location of the source UE, and the positional information of the at least one target UE further includes the first relative position and the second relative position.

Clause 46. The network entity of clause 44, wherein the at least one processor is configured to determine the second location of the first target UE utilizing a first location data received, via the at least one transceiver, and determine the third location of the second target UE utilizing a second location data received, via the at least one transceiver.

Clause 47. The network entity of clause 40, wherein the positional information of the at least one target UE includes the location of the at least one target UE.

Clause 48. The network entity of clause 40, wherein the at least one processor is further configured to determine whether the location of the at least one target UE is private, and disable a transmission of the positional information of the at least one target UE to the source UE based on the location of the at least one target UE being private.

Clause 49. The network entity of clause 40, wherein the at least one processor is further configured to receive a request from the source UE, via the at least one transceiver, for a location of the at least one target UE, wherein the request includes source identification data of the source UE and the source identification data identify the source UE, transmit the request from the source UE to the at least one target UE via the at least one transceiver, receive a denial message from the at least one target UE based on the source identification data, and determine that the location of the at least one target UE is private based on the denial message.

Clause 50. A method for determining a position of at least one target user equipment (UE) with respect to a source UE with a network entity in communication with a communications network, the method comprising: determining a first location of the source UE; determining a location of the at least one target UE; and transmitting, via at least one transceiver, positional information of the at least one target UE with respect to the first location of the source UE to the source UE, wherein the positional information of the at least one target UE is based on the location of the at least one target UE.

Clause 51. The method of clause 50, further comprises determining at least (a) a range data based on the first location of the source UE and the location of the at least one target UE, or (b) a relative position of the at least one target UE with respect to the first location of the source UE, and wherein the positional information of the at least one target UE further includes the range data, the relative position of the at least one target UE, or both.

Clause 52. The method of clause 50, wherein determining the location of the at least one target UE includes receiving locational data, via the at least one transceiver, from at least one radio access network (RAN) that is in communication with the at least one target UE and the communications network.

Clause 53. The method of clause 52, further comprises transmitting the positional information of the at least one target UE to the source UE via the at least one transceiver and a first RAN, wherein the at least one RAN includes the first RAN that is in communication with the source UE.

Clause 54. The method of clause 52, further comprises transmitting the positional information of the at least one target UE to the source UE via the at least one transceiver and a second RAN, wherein the at least one RAN also includes the second RAN that is in communication with the source UE.

Clause 55. The method of clause 50, further includes receiving, via the at least one transceiver, a request from the source UE for the positional information of the at least one target UE, determining the location of the at least one target UE, and transmitting the positional information to the source UE.

Clause 56. The method of clause 55, further comprises generating identification information for one or more target UEs within a coverage area of an at least one radio access network (RAN) in communication with the network entity, wherein the one or more target UEs includes the at least one target UE, and transmitting, via the at least one transceiver, at least one message to the source UE, wherein the at least one message includes the identification information.

Clause 57. The method of clause 56, further comprises determining a second location of a first target UE, determining a third location of a second target UE, wherein the at least one target UE includes the first target UE and the second target UE, determining a first range data based on the first location of the source UE and the second location of the first target UE, and determining a second range data based on the first location of the source UE and the third location of the second target UE, and wherein the positional information of the at least one target UE includes the first range data and the second range data.

Clause 58. The method of clause 57, further comprises determining a first relative position of the first target UE with respect to the first location of the source UE, and determining a second relative position of the first target UE with respect to the first location of the source UE, and wherein the positional information of the at least one target UE further includes the first relative position and the second relative position.

Clause 59. The method of clause 57, further comprises determining the second location of the first target UE utilizing a first location data received, via the at least one transceiver, from a first RAN that is in communication with the first target UE and the communications network, and determining the third location of the second target UE utilizing a second location data received, via the at least one transceiver, from a second RAN that is in communication with the second target UE and the communications network.

Clause 60. The method of clause 56, further comprises determining the second location of the first target UE utilizing a first location data received, via the at least one transceiver, from a first RAN that is in communication with the first target UE and the communications network, and determining the third location of the second target UE utilizing a second location data received, via the at least one transceiver, from the first RAN, wherein the first RAN is also in communication with the second target UE, and wherein the at least one RAN includes the first RAN and a second RAN.

Clause 61. The method of clause 60, further comprises transmitting the positional information of the at least one target UE to the source UE via the at least one transceiver and the first RAN, wherein the first RAN is also in communication with the source UE.

Clause 62. The method of clause 60, further comprises transmitting the positional information of the at least one target UE to the source UE via the at least one transceiver and the second RAN, wherein the second RAN is in communication with the source UE.

Clause 63. The method of clause 50, wherein the positional information of the at least one target UE includes the location of the at least one target UE.

Clause 64. The method of clause 50, further comprises determining whether the location of the at least one target UE is private, and disabling a transmission of the positional information of the at least one target UE to the source UE if the location of the at least one target UE is private.

Clause 65. The method of clause 64, further comprises receiving a request from the source UE, via the at least one transceiver, for the location of the at least one target UE, wherein the request includes source identification data of the source UE and the source identification data is configured to identify the source UE to the at least one target UE, transmitting the request from the source UE to the at least one target UE via the at least one transceiver, and receiving a denial message from the at least one target UE based on the source identification data, wherein the location of the at least one target UE is determined to be private based on the denial message.

Clause 66. A network entity for determining a position of at least one target user equipment (UE) with respect to a source UE in a communications network, the network entity comprising: means for determining a first location of the source UE; means for determining a location of the at least one target UE; and means for transmitting positional information of the at least one target UE with respect to the first location of the source UE to the source UE, wherein the positional information of the at least one target UE is based on the location of the at least one target UE.

Clause 67. The network entity of clause 66, further comprises means for determining a range data based on the first location of the source UE and the location of the at least one target UE, means for determining a relative position of the at least one target UE with respect to the first location of the source UE, and wherein the positional information of the at least one target UE further includes the range data and the relative position of the at least one target UE.

Clause 68. The network entity of clause 67, wherein the means for determining the location of the at least one target UE includes means for receiving locational data from at least one radio access network (RAN) that is in signal communication with the at least one target UE and the communications network.

Clause 69. The network entity of clause 68, further comprises means for transmitting the positional information of the at least one target UE to the source UE via a first RAN, wherein the at least one RAN includes the first RAN that is in signal communication with the source UE.

Clause 70. The network entity of clause 67, further comprises means for transmitting the positional information of the at least one target UE to the source UE via a second RAN, wherein the at least one RAN also includes the second RAN that is in signal communication with the source UE.

Clause 71. The network entity of clause 66, further includes means for receiving a request from the source UE for the positional information of the at least one target UE, means for determining the location of the at least one target UE, and means for transmitting the positional information to the source UE.

Clause 72. The network entity of clause 71, further comprises means for generating identification information for a plurality of target UEs within a coverage area of an at least one radio access network (RAN) in signal communication with the network entity, wherein the plurality of target UEs includes the at least one target UE, and means for transmitting a situational awareness message to the source UE, wherein the situational awareness message includes the identification information.

Clause 73. The network entity of clause 72, further comprises means for determining a second location of a first target UE, means for determining a third location of a second target UE, wherein the at least one target UE includes the first target UE and the second target UE, means for determining a first range data based on the first location of the source UE and the second location of the first target UE, and means for determining a second range based on the first location of the source UE and the third location of the second target UE, and wherein the positional information of the at least one target UE includes the first range data and the second range data.

Clause 74. The network entity of clause 73, further comprises means for determining a first relative position of the first target UE with respect to the first location of the source UE, and means for determining a second relative position of the first target UE with respect to the first location of the source UE, and wherein the positional information of the at least one target UE further includes the first relative position and the second relative position.

Clause 75. The network entity of clause 73, further comprises means for determining the second location of the first target UE utilizing a first location data received from a first RAN that is in signal communication with the first target UE and the communications network, and means for determining the third location of the second target UE utilizing a second location data received from a second RAN that is in signal communication with the second target UE and the communications network.

Clause 76. The network entity of clause 73, further comprises means for determining the second location of the first target UE utilizing a first location data received from a first RAN that is in signal communication with the first target UE and the communications network, and means for determining the third location of the second target UE utilizing a second location data received from the first RAN, wherein the first RAN is also in signal communication with the second target UE, and wherein the at least one RAN includes the first RAN and a second RAN.

Clause 77. The network entity of clause 76, further comprises means for transmitting the positional information of the at least one target UE to the source UE via the first RAN, wherein the first RAN is also in signal communication with the source UE.

Clause 78. The network entity of clause 76, further comprises means for transmitting the positional information of the at least one target UE to the source UE via the second RAN, wherein the second RAN is in signal communication with the source UE.

Clause 79. The network entity of clause 66, wherein the positional information of the at least one target UE includes the location of the at least one target UE.

Clause 80. The network entity of clause 66, further comprises means for determining whether the location of the at least one target UE is private, and means for disabling a transmission of the positional information of the at least one target UE to the source UE if the location of the at least one target UE is private.

Clause 81. The network entity of clause 80, further comprises means for receiving a request from the source UE for the location of the at least one target UE, wherein the request includes source identification data of the source UE and the source identification data is configured to identify the source UE to the at least one target UE, means for transmitting the request from the source UE to the at least one target UE, and means for receiving a denial message from the at least one target UE based on the source identification data, wherein the location of the at least one target UE is determined to be private based on the denial message.

Clause 82. A non-transitory processor-readable storage medium comprising processor-readable instructions configured to cause one or more processors to determine position of at least one target user equipment (UE) with respect to a source UE in a communications network, the non-transitory processor-readable storage medium comprising: code for determining a first location of the source UE; code for determining a location of the at least one target UE; and code for transmitting positional information of the at least one target UE with respect to the first location of the source UE to the source UE, wherein the positional information of the at least one target UE is based on the location of the at least one target UE.

Clause 83. The non-transitory processor-readable storage medium of clause 82, further comprises code for determining a range data based on the first location of the source UE and the location of the at least one target UE, code for determining a relative position of the at least one target UE with respect to the first location of the source UE, and wherein the positional information of the at least one target UE further includes the range data and the relative position of the at least one target UE.

Clause 84. The non-transitory processor-readable storage medium of clause 83, wherein the code for determining the location of the at least one target UE includes code for receiving locational data from at least one radio access network (RAN) that is in signal communication with the at least one target UE and the communications network.

Clause 85. The non-transitory processor-readable storage medium of clause 84, further comprises code for transmitting the positional information of the at least one target UE to the source UE via a first RAN, wherein the at least one RAN includes the first RAN that is in signal communication with the source UE.

Clause 86. The non-transitory processor-readable storage medium of clause 84, further comprises code for transmitting the positional information of the at least one target UE to the source UE via a second RAN, wherein the at least one RAN also includes the second RAN that is in signal communication with the source UE.

Clause 87. The non-transitory processor-readable storage medium of clause 82, further includes code for receiving a request from the source UE for the positional information of the at least one target UE, code for determining the location of the at least one target UE, and code for transmitting the positional information to the source UE.

Clause 88. The non-transitory processor-readable storage medium of clause 87, further comprises code for generating identification information for a plurality of target UEs within a coverage area of an at least one radio access network (RAN) in signal communication with a network entity, wherein the plurality of target UEs includes the at least one target UE, and code for transmitting a situational awareness message to the source UE, wherein the situational awareness message includes the identification information.

Clause 89. The non-transitory processor-readable storage medium of clause 88, further comprises code for determining a second location of a first target UE, code for determining a third location of a second target UE, wherein the at least one target UE includes the first target UE and the second target UE, code for determining a first range data based on the first location of the source UE and the second location of the first target UE, and code for determining a second range based on the first location of the source UE and the third location of the second target UE, and wherein the positional information of the at least one target UE includes the first range data and the second range data.

Clause 90. The non-transitory processor-readable storage medium of clause 89, further comprises code for determining a first relative position of the first target UE with respect to the first location of the source UE, and code for determining a second relative position of the first target UE with respect to the first location of the source UE, and wherein the positional information of the at least one target UE further includes the first relative position and the second relative position.

Clause 91. The non-transitory processor-readable storage medium of clause 89, further comprises code for determining the second location of the first target UE utilizing a first location data received from a first RAN that is in signal communication with the first target UE and the communications network, and code for determining the third location of the second target UE utilizing a second location data received from a second RAN that is in signal communication with the second target UE and the communications network.

Clause 92. The non-transitory processor-readable storage medium of clause 89, further comprises code for determining the second location of the first target UE utilizing a first location data received from a first RAN that is in signal communication with the first target UE and the communications network, and code for determining the third location of the second target UE utilizing a second location data received from the first RAN, wherein the first RAN is also in signal communication with the second target UE, and wherein the at least one RAN includes the first RAN and a second RAN.

Clause 93. The non-transitory processor-readable storage medium of clause 92, further comprises code for transmitting the positional information of the at least one target UE to the source UE via the first RAN, wherein the first RAN is also in signal communication with the source UE.

Clause 94. The non-transitory processor-readable storage medium of clause 92, further comprises code for transmitting the positional information of the at least one target UE to the source UE via the second RAN, wherein the second RAN is in signal communication with the source UE.

Clause 95. The non-transitory processor-readable storage medium of clause 82, wherein the positional information of the at least one target UE includes the location of the at least one target UE.

Clause 96. The non-transitory processor-readable storage medium of clause 82, further comprises code for determining whether the location of the at least one target UE is private, and code for disabling a transmission of the positional information of the at least one target UE to the source UE if the location of the at least one target UE is private.

Clause 97. The non-transitory processor-readable storage medium of clause 96, further comprises code for receiving a request from the source UE for the location of the at least one target UE, wherein the request includes source identification data of the source UE and the source identification data is configured to identify the source UE to the at least one target UE, code for transmitting the request from the source UE to the at least one target UE, and code for receiving a denial message from the at least one target UE based on the source identification data, wherein the location of the at least one target UE is determined to be private based on the denial message.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in a network entity 510 may be performed outside of the network entity 510.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
   at least one transceiver;
   at least one memory; and
   at least one processor, coupled with the at least one transceiver and the at least one memory, the at least one processor configured to:
      receive at least one message from the network entity, the at least one message includes identification information for one or more target UEs within a coverage area of the at least one RAN;
      transmit, over a radio interface, to a network entity of a communication network that includes at least one Radio Access Network (RAN), via the at least one transceiver, a request for positional information of at least one target UE with respect to a first location of the UE, wherein the request is based on the identification information of the at least one target UE of the one or more target UEs; and
      receive, over the radio interface, from the network entity, via the at least one transceiver, the positional information, wherein the positional information is based on a location of the at least one target UE.

2. The UE of claim 1, wherein the at least one processor is further configured to generate target identification data, wherein the target identification data is based on previously acquired identification information, and transmit the request for the positional information based on the target identification data.

3. The UE of claim 1, wherein the at least one processor is further configured to generate target identification data, wherein the target identification data is based on previously acquired identification information, and transmit to the at least one target UE, via the at least one transceiver, via a sidelink channel utilizing the target identification data, a request for direct positional information from the at least one target UE.

4. The UE of claim 1, wherein the at least one processor is further configured to transmit to the network entity, via the at least one transceiver, a request for confidentiality of the first location of the UE.

5. The UE of claim 1, wherein the at least one processor is further configured to receive a request from the network entity, via the at least one transceiver, for the first location of the UE, the request includes source identification data of a requesting UE and the source identification data is configured to identify the requesting UE to the UE, the at least one processor is further configured to transmit a denial message to the network entity, and the denial message denies transmitting the first location of the UE to the requesting UE based on the source identification data.

6. The UE of claim 1, wherein the at least one processor is configured to receive a relative position of the at least one target UE with respect to the first location of the UE, and the relative position of the at least one target UE with respect to the first location of the UE is included in the positional information.

7. The UE of claim 1, wherein the at least one processor is further configured to receive a range between the at least one target UE and the first location of the UE, and the range between the at least one target UE and the first location of the UE is included in the positional information.

8. A method for determining a position of at least one target user equipment (UE) with respect to a source UE, wherein the source UE and at least one target UE are in communication with a communication network having at least one radio access network (RAN) and a network entity, the method comprising:

receiving at least one message from the network entity, wherein the at least one message includes identification information for one or more target UEs within a coverage area of the at least one RAN;

transmitting to the network entity, via at least one transceiver and the at least one RAN, a request for positional information of the at least one target UE with respect to a first location of the source UE, wherein the request is based on the identification information of the at least one target UE of the one or more target UEs; and receiving from the network entity, via the at least one transceiver, the positional information, wherein the positional information is based on a location of the at least one target UE.

9. The method of claim 8, further comprises generating target identification data, wherein the target identification data is based on previously acquired identification information, and transmitting the request for the positional information based on the target identification data.

10. The method of claim 8, further comprises generating target identification data, wherein the target identification data is based on previously acquired identification information, and transmitting to the at least one target UE, via the at least one transceiver, a request for direct positional information from the at least one target UE via a sidelink channel utilizing the target identification data.

11. The method of claim 8, further comprises transmitting to the network entity, via the at least one transceiver, a request for confidentiality of the first location of the UE.

12. The method of claim 8, further comprises receiving a request from the network entity, via the at least one transceiver and the at least one RAN, for the first location of the source UE, and wherein the request includes source identification data of a requesting UE and the source identification data is configured to identify the requesting UE to the source UE.

13. The method of claim 12, further comprises transmitting a denial message to the network entity, and wherein the denial message denies transmitting the first location of the source UE to the requesting UE based on the source identification data.

14. The method of claim 8, further comprises receiving a relative position of the at least one target UE with respect to the first location of the source UE, and wherein the relative position of the at least one target UE with respect to the first location of the source UE is included in the positional information.

15. The method of claim 8, further comprises receiving a range between the at least one target UE and the first location of the source UE, and wherein the range between the at least one target UE and the first location of the source UE is included in the positional information.

16. The method of claim 8, further comprises transmitting to the network entity, via the at least one transceiver and the at least one RAN, source identification data of the UE, wherein the source identification data is configured to identify the source UE to the at least one target UE.

17. The method of claim 16, wherein the positional information includes a denial message if the at least one target UE denies transmitting a position of the at least one target UE to the source UE based on the source identification data.

18. A network entity comprising:

at least one transceiver;

at least one memory; and at least one processor, coupled with the at least one transceiver and the at least one memory, the at least one processor configured to:

generate identification information for one or more target UEs within a coverage area of an at least one radio access network (RAN), wherein the one or more target UEs includes at least one target UE;

transmit, via the at least one transceiver, at least one message to a source user equipment (UE), wherein the at least one message includes the identification information;

receive, via the at least one transceiver, a request from the source UE for the positional information of the at least one target UE;

determine a first location of the source UE;

determine a location of the at least one target UE; and transmit, via the at least one transceiver, positional information of the at least one target UE with respect to the first location of the source UE to the source UE, wherein the positional information of the at least one target UE is based on the location of the at least one target UE.

19. The network entity of claim 18, wherein the at least one processor is further configured to determine at least (a) range data based on the first location of the source UE and the location of the at least one target UE, or (b) a relative position of each of the at least one target UE with respect to the first location of the source UE, and the positional information of the at least one target UE further includes the range data, the relative position of the at least one target UE, or both.

20. The network entity of claim 18, wherein the at least one target UE includes a first target UE and a second target UE, the at least one processor is further configured to determine a second location of the first target UE, determine a third location of the second target UE, determine first range data based on the first location of the source UE and the second location of the first target UE, determine second range data based on the first location of the source UE and the third location of the second target UE, and the positional information of the at least one target UE includes the first range data and the second range data.

21. The network entity of claim 20, wherein the at least one processor is further configured to:

determine a first relative position of the first target UE with respect to the first location of the source UE; and determine a second relative position of the first target UE with respect to the first location of the source UE, and the positional information of the at least one target UE further includes the first relative position and the second relative position.

22. The network entity of claim 20, wherein the at least one processor is configured to determine the second location of the first target UE utilizing a first location data received, via the at least one transceiver, and determine the third location of the second target UE utilizing a second location data received, via the at least one transceiver.

23. The network entity of claim 18, wherein the positional information of the at least one target UE includes the location of the at least one target UE.

24. The network entity of claim 18, wherein the at least one processor is further configured to determine whether the location of the at least one target UE is private, and disable a transmission of the positional information of the at least one target UE to the source UE based on the location of the at least one target UE being private.

25. The network entity of claim 18, wherein the at least one processor is further configured to receive a request from the source UE, via the at least one transceiver, for a location of the at least one target UE, wherein the request includes source identification data of the source UE and the source identification data identify the source UE, transmit the request from the source UE to the at least one target UE via the at least one transceiver, receive a denial message from the at least one target UE based on the source identification data, and determine that the location of the at least one target UE is private based on the denial message.

26. A method for determining a position of at least one target user equipment (UE) with respect to a source UE with a network entity in communication with a communications network, the method comprising:

generating identification information for one or more target UEs within a coverage area of an at least one radio access network (RAN) in communication with the network entity, wherein the one or more target UEs includes the at least one target UE, and transmitting, via at least one transceiver, at least one message to the source UE, wherein the at least one message includes the identification information;

receiving, via the at least one transceiver, a request from the source UE for the positional information of the at least one target UE;

determining a first location of the source UE;

determining a location of the at least one target UE; and transmitting, via at least one transceiver, positional information of the at least one target UE with respect to the first location of the source UE to the source UE, wherein the positional information of the at least one target UE is based on the location of the at least one target UE.

27. The method of claim 26, further comprises:

determining at least (a) a range data based on the first location of the source UE and the location of the at least one target UE, or (b) a relative position of the at least one target UE with respect to the first location of the source UE, and wherein the positional information of the at least one target UE further includes the range data, the relative position of the at least one target UE, or both.

28. The method of claim 26, wherein determining the location of the at least one target UE includes receiving locational data, via the at least one transceiver, from at least one radio access network (RAN) that is in communication with the at least one target UE and the communications network.

29. The method of claim 28, further comprises transmitting the positional information of the at least one target UE to the source UE via the at least one transceiver and a first RAN, wherein the at least one RAN includes the first RAN that is in communication with the source UE.

30. The method of claim 28, further comprises transmitting the positional information of the at least one target UE to the source UE via the at least one transceiver and a second RAN, wherein the at least one RAN also includes the second RAN that is in communication with the source UE.

31. The method of claim 26, further comprises determining a second location of a first target UE, determining a third location of a second target UE, wherein the at least one target UE includes the first target UE and the second target UE, determining a first range data based on the first location of the source UE and the second location of the first target UE, and determining a second range data based on the first location of the source UE and the third location of the second target UE, and wherein the positional information of the at least one target UE includes the first range data and the second range data.

32. The method of claim 31, further comprises determining a first relative position of the first target UE with respect to the first location of the source UE, and determining a second relative position of the first target UE with respect to the first location of the source UE, and wherein the positional information of the at least one target UE further includes the first relative position and the second relative position.

33. The method of claim 31, further comprises determining the second location of the first target UE utilizing a first location data received, via the at least one transceiver, from a first RAN that is in communication with the first target UE and the communications network, and determining the third location of the second target UE utilizing a second location data received, via the at least one transceiver, from a second RAN that is in communication with the second target UE and the communications network.

34. The method of claim 31, further comprises determining the second location of the first target UE utilizing a first location data received, via the at least one transceiver, from a first RAN that is in communication with the first target UE and the communications network, and determining the third location of the second target UE utilizing a second location data received, via the at least one transceiver, from the first RAN, and wherein the first RAN is also in communication with the second target UE, and wherein the at least one RAN includes the first RAN and a second RAN.

35. The method of claim 34, further comprises transmitting the positional information of the at least one target UE to the source UE via the at least one transceiver and the first RAN, wherein the first RAN is also in communication with the source UE.

36. The method of claim 34, further comprises transmitting the positional information of the at least one target UE to the source UE via the at least one transceiver and the second RAN, wherein the second RAN is in communication with the source UE.

37. The method of claim 26, wherein the positional information of the at least one target UE includes the location of the at least one target UE.

38. The method of claim 26, further comprises determining whether the location of the at least one target UE is private, and disabling a transmission of the positional information of the at least one target UE to the source UE if the location of the at least one target UE is private.

39. The method of claim 38, further comprises receiving a request from the source UE, via the at least one transceiver, for the location of the at least one target UE, wherein the request includes source identification data of the source UE and the source identification data is configured to identify the source UE to the at least one target UE, transmitting the request from the source UE to the at least one target UE via the at least one transceiver, and receiving a denial message from the at least one target UE based on the source identification data, wherein the location of the at least one target UE is determined to be private based on the denial message.

* * * * *